United States Patent [19]
Keltner

[11] Patent Number: 5,231,843
[45] Date of Patent: Aug. 3, 1993

[54] PORTABLE REFRIGERANT HANDLING APPARATUS AND ASSOCIATED METHODS

[75] Inventor: Robert L. Keltner, Scurry, Tex.

[73] Assignee: Technical Chemical Company, Dallas, Tex.

[21] Appl. No.: 968,199

[22] Filed: Oct. 29, 1992

Related U.S. Application Data

[60] Division of Ser. No. 860,088, Mar. 30, 1992, which is a continuation-in-part of Ser. No. 715,429, Jun. 14, 1991, Pat. No. 5,168,720, which is a continuation-in-part of Ser. No. 588,561, Sep. 26, 1990, Pat. No. 5,117,641.

[51] Int. Cl.$^5$ .................................................. F25B 45/00
[52] U.S. Cl. ........................................ 62/77; 62/85; 62/292; 62/303
[58] Field of Search ............... 62/292, 149, 475, 195, 62/77, 85, 303

[56] References Cited

U.S. PATENT DOCUMENTS

| | | | |
|---|---|---|---|
| 4,389,166 | 6/1983 | Harvey et al. | 417/234 |
| 4,934,390 | 6/1990 | Sapp | 62/303 |
| 5,138,847 | 8/1992 | Rollins | 62/292 |

Primary Examiner—John M. Sollecito
Attorney, Agent, or Firm—Konneker, Bush & Hitt

[57] ABSTRACT

Portable, hand carryable acid purification and flushing and transfer systems are provided for use in various refrigerant recovery, recycling and flushing operations performed in conjunction with an air conditioning circuit. The acid purification system is disposed within a carrying housing and includes an accumulation/distillation type acid separator piped in series with a pair of cylindrical dual core filter assemblies. A pair of refrigerant inlet and outlet fittings are externally mounted on the housing. By connecting these fittings in a forced flow refrigerant circuit the refrigerant is passed sequentially through the acid separator and the first and second filter assemblies to cleanse the refrigerant of acid and particulate impurities therein. The portable flushing and transfer system is also disposed in a carrying housing and includes a high capacity liquid refrigerant transfer pump piped in series with a check valve and a relief valve. Inlet and outlet valves mounted on the housing may be connected to an air conditioning circuit to provide for rapid recycling or recovery of its refrigerant. An adapter kit is furnished with the flushing and transfer system and includes connecting hoses, strainer and filtration apparatus, and specially designed adapter fittings that permit the system to be connected to a variety of air conditioning circuits.

1 Claim, 5 Drawing Sheets

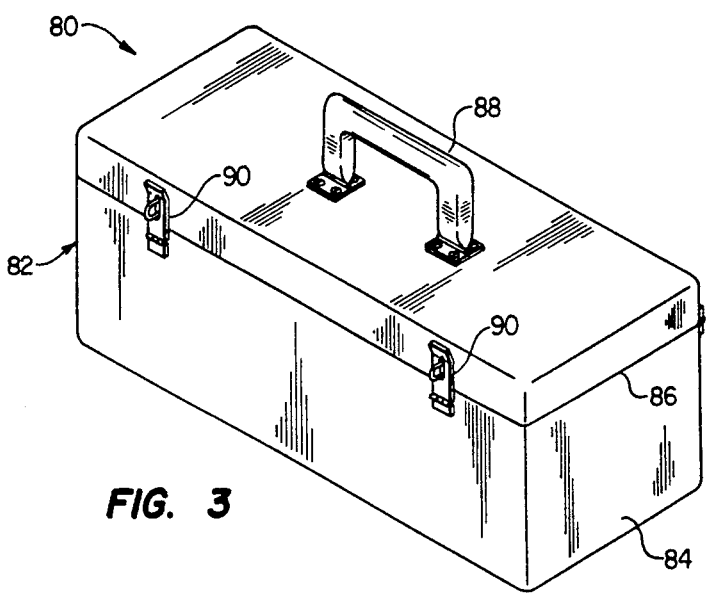
FIG. 3
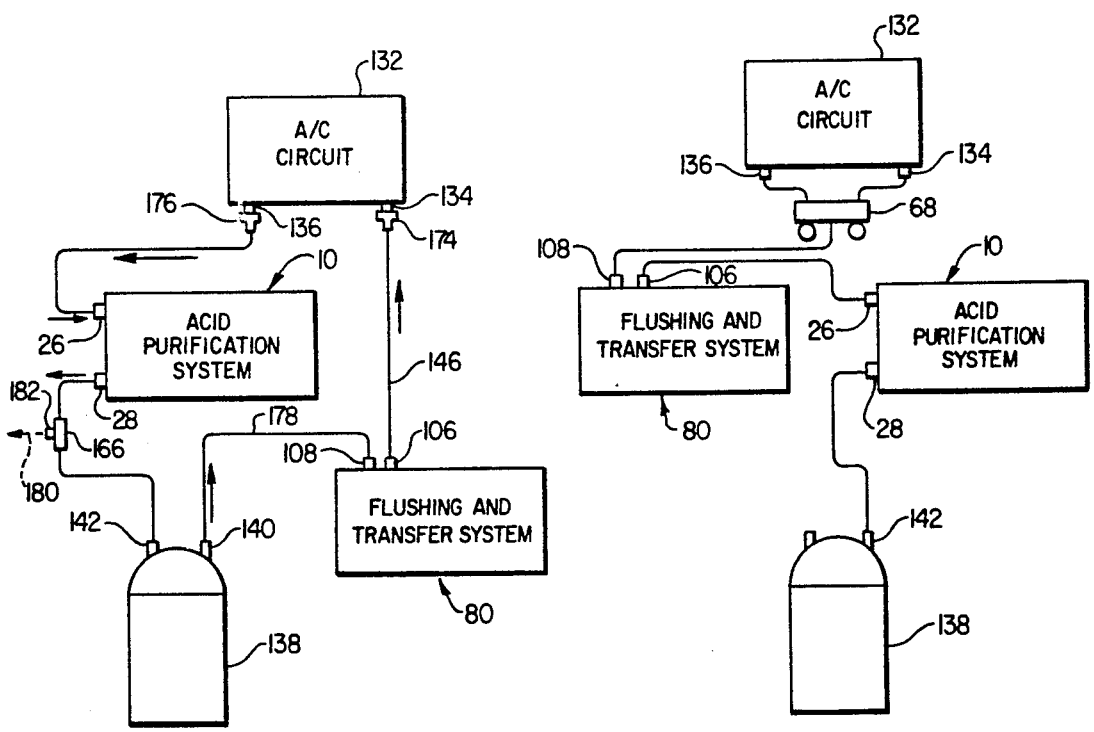
FIG. 6
FIG. 8

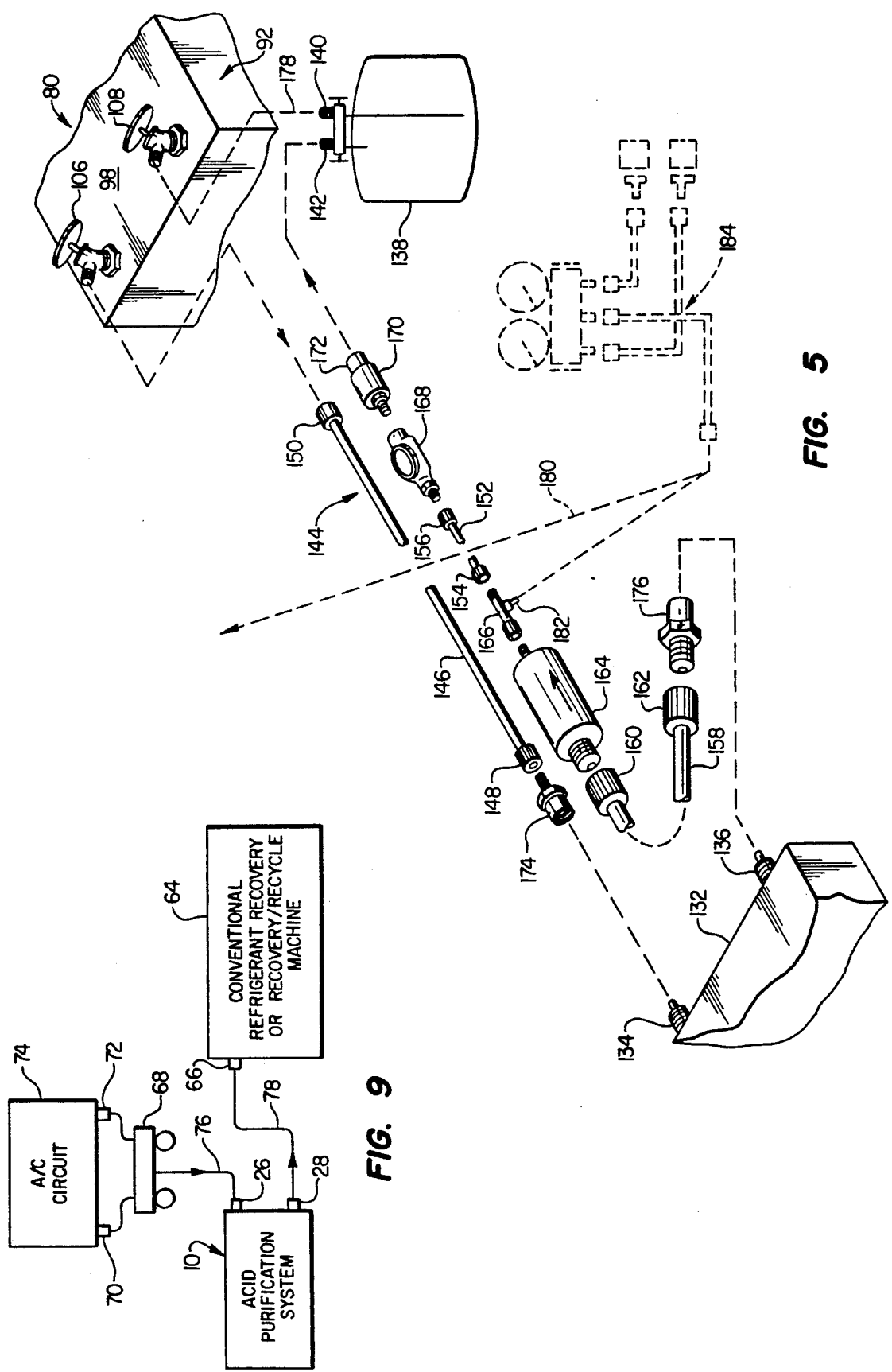

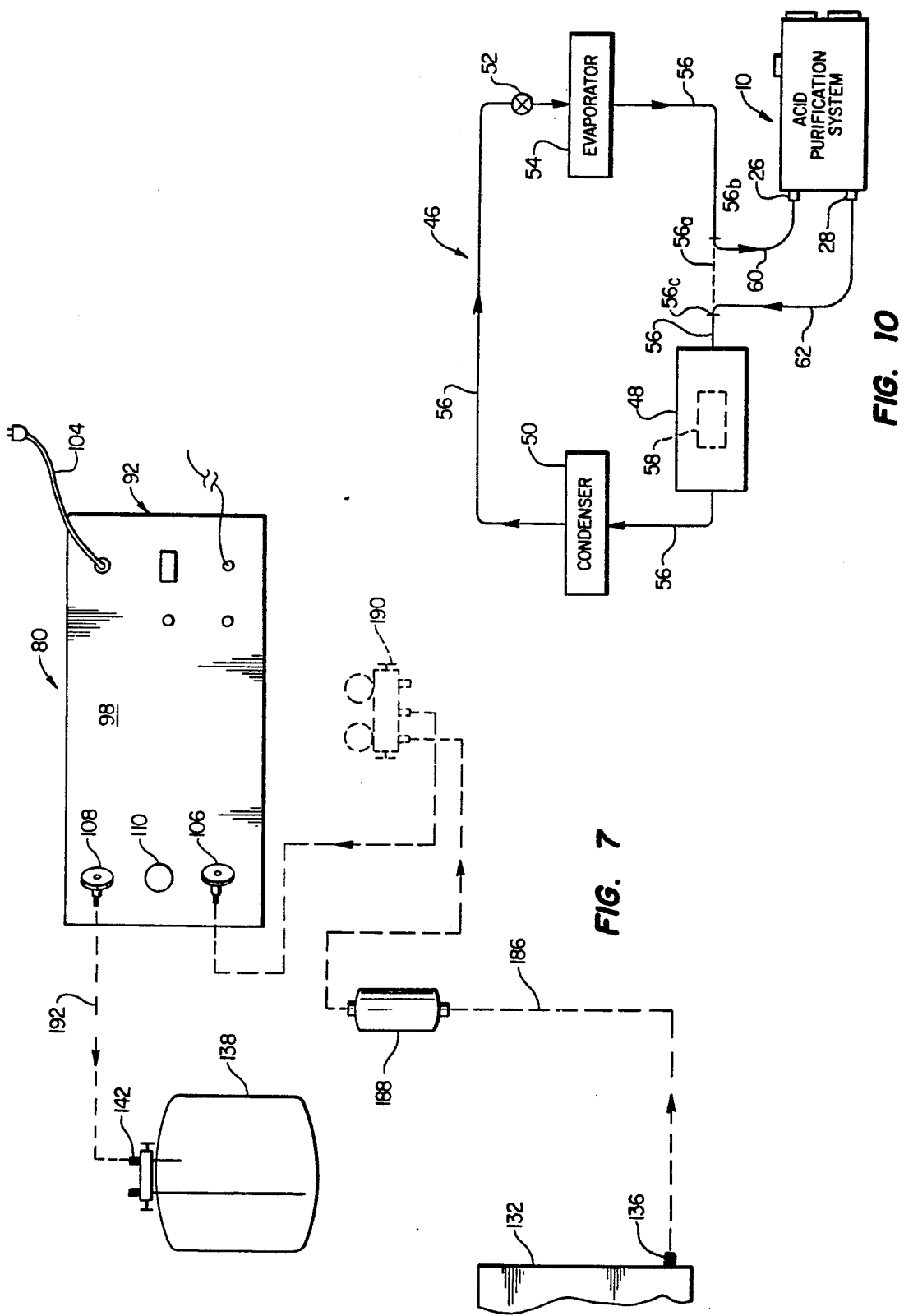

PORTABLE REFRIGERANT HANDLING APPARATUS AND ASSOCIATED METHODS

CROSS-REFERENCE TO RELATED APPLICATIONS

This application is a division of U.S. application Ser. No. 07/860,088 filed on Mar. 30, 1992 and entitled "PORTABLE REFRIGERANT HANDLING APPARATUS AND ASSOCIATED METHODS".

U.S. application Ser. No. 07/860,088 was a continuation-in-part of U.S. application Ser. No. 715,429 filed on Jun. 14, 1991 and entitled "REFRIGERANT RECOVERY SYSTEM WITH FLUSH MODE AND ASSOCIATED FLUSHING ADAPTER APPARATUS", now U.S. Pat. No. 5,168,720.

U.S. application Ser. No. 715,429 was a continuation-in-part of U.S. application Ser. No. 588,561 filed on Sep. 26, 1990 and entitled "REFRIGERANT RECOVERY SYSTEM WITH FLUSH MODE", now U.S. Pat. No. 5,117,641.

The disclosures of these prior applications are hereby incorporated by reference herein.

BACKGROUND OF THE INVENTION

The present invention relates generally to the handling of refrigerant and, in a preferred embodiment thereof, more particularly relates to apparatus and associated methods used in refrigerant recovery, recycling and flushing operations carried out in conjunction with air conditioning refrigerant circuits.

The refrigerant repeatedly cycled through a typical air conditioning circuit—normally consisting of a compressor, condenser, expansion valve and evaporator connected in series—is subject to contamination from a variety of causes requiring that the contaminated refrigerant be cleansed or replaced. For example, a burnout of the circuit's compressor motor typically contaminates the circuit refrigerant with acid, moisture, and a variety of "trash" such as valve reeds, piston rings and metal shavings - all of which would be highly detrimental to the new compressor motor subsequently installed if not appropriately removed from the air conditioning circuit.

For many years, the conventional approach to handling contaminated refrigerant was simply to vent it to atmosphere, flush out the circuit using high pressure compressed air, and then recharge the circuit with new refrigerant prior to the installation and operation of the new compressor motor. This long-used technique, however, wastes expensive refrigerant. It is also now known to be deleterious to the environment. Because of this, the prior practice of simply dumping contaminated refrigerant to atmosphere is, to a rapidly increasing extent, being proscribed by applicable environmental regulations.

In response to the growing awareness of cost and environmental protection, various "closed loop" methods of handling contaminated refrigerant have been proposed to prevent refrigerant discharge to atmosphere. There are now basically three types of closed loop processes used to deal with the problems of contaminated refrigerant in an air conditioning circuit - recovery, recycling and flushing.

The closed loop refrigerant recovery process entails simply drawing the contaminated refrigerant through appropriate piping or hoses into a closed receiving vessel which may later be moved to a processing location where the contaminated refrigerant in the vessel may be cleanses and re-used. The recycling process involves the circulation of the contaminated refrigerant through a recycling circuit externally connected to the air conditioning circuit and functioning to cleanse the refrigerant of impurities therein, such as acid and moisture, so that the cleansed refrigerant can be directly re-used in the air conditioning circuit. The flushing process is conventionally carried out by forcing clean refrigerant through the previously emptied air conditioning circuit and then, through a closed loop path, into a suitable receiving vessel for subsequent cleansing and recycling.

Various closed loop combination refrigerant recovery/recycling machines have been conventionally utilized to perform both the recovery and recycling processes described above. Additionally, a recovery/recycling machine having a refrigerant flush mode uniquely incorporated therein is illustrated and described in the aforementioned copending U.S. application Ser. No. 715,429, now U.S. Pat. No. 5,168,720.

Though quite useful in providing their refrigerant handling functions in a closed loop fashion so as to eliminate harmful refrigerant discharge to atmosphere, these machines are typically characterized by a large size and weight (usually weighing on the order of 300 pounds) and are relatively expensive and complex. Additionally, at least the conventionally constructed machines tend to have relatively slow recovery and recycling rates since they handle the refrigerant being recovered and/or recycled in a gaseous phase.

The sheer size and weight of previously utilized refrigerant recovery/recycling machines has tended to make them relatively difficult to use in a variety of commonly encountered limited access situations. For example, when the compressor burns out on a roof-mounted air conditioning unit it is difficult, if not impossible, to use a conventional closed loop refrigerant handling machine to recover or recycle the contaminated refrigerant in the air conditioning circuit since the moving of a 300 or so pound machine up to the rooftop presents at best a rather formidable task.

It can be seen from the foregoing that is would be desirable to provide improved closed loop refrigerant handling apparatus and methods that eliminate, or at least significantly reduce, the above-mentioned problems, limitations and disadvantages of the refrigerant handling equipment generally described above. It is accordingly an object of the present invention to provide such improved apparatus and methods.

SUMMARY OF THE INVENTION

In carrying out principles of the present invention, in accordance with illustrated preferred embodiments thereof, specially designed portable, hand carryable refrigerant handling apparatus is provided for use in various refrigerant recovery, recycling and flushing operations in conjunction with an air conditioning refrigerant circuit.

The apparatus includes a portable, hand carryable acid purification system for use in removing particulate contaminants, and acid-laden oil, from a throughflow of refrigerant forced through the system. In a preferred embodiment thereof, the system includes a housing having a carrying handle operatively secured thereto, an external inlet valve mounted on the housing for receiving the refrigerant throughflow, and an external outlet valve mounted on the housing for discharging the refrigerant throughflow. An accumulation/distillation type oil separator and at least one filter assembly are disposed in the housing. A refrigerant conduit, also disposed in the housing, is interconnected between the inlet and outlet valves. The oil separator and the filter apparatus are connected in series in the conduit, with the oil separator being upstream of the filter apparatus.

The refrigerant handling apparatus of the present invention also includes a portable, hand carryable refrigerant flushing and transfer system. In a preferred embodiment thereof, this system includes a housing having an open-topped base portion, a lid portion hingedly secured to the upper end of the base portion and having a carrying handle secured thereto, and latch means for releasably securing the lid portion to the base portion in a closed orientation over the open top of the base portion. A drop-in tray structure is removably insertable into the housing base portion through the open top thereof, and has a top wall and a bottom wall. Refrigerant inlet and outlet valves are secured to and project upwardly from the top tray structure wall and are operative to respectively receive and discharge a flow of refrigerant. A liquid refrigerant is mounted on the bottom tray structure wall and has a electric drive motor, an inlet, and an outlet. Conduit means are provided for connecting the pump outlet to the refrigerant outlet valve, and for connecting the pump inlet to the refrigerant inlet valve.

In accordance with an aspect of the present invention, the portable refrigerant flushing and transfer system is provided with a specially designed adapter kit which permits it to be used in the liquid refrigerant flushing of a variety of air conditioning circuits. The kit comprises hose means for operatively connecting the system in series with a liquid refrigerant storage container and the air conditioning circuit to be flushed, refrigerant strainer and filter means connected in the hose means, and a series of specially configured adapter fitting pairs removably connectable between the hose means and inlet and outlet fittings of the air conditioning refrigerant circuit. The pairs of adapter fittings are shaped to fit a variety of air conditioning circuit inlet and outlet fittings, thereby permitting the portable refrigerant flushing and transfer system to be used with various different air conditioning refrigerant circuits.

According to methods of the present invention, these two portable, hand carryable systems may be advantageously utilized in the following representative manners in conjunction with an air conditioning refrigerant circuit:

1. The portable acid purification system may be used as a high capacity prefilter apparatus to protect the compressor of a conventional refrigerant recovery machine against acid damage when the machine is being used to recover refrigerant from an air conditioning refrigerant circuit having a previously burned out compressor motor that introduced acid-laden oil, and particulate contaminants, into the circuit refrigerant. The acid purification system is simply connected in series between the recovery machine inlet and the air conditioning, circuit so that the refrigerant being withdrawn from the air conditioning circuit sequentially passes through the oil separator and filter structure of the acid purification system before entering the recovery machine.

2. The portable acid purification system may also be used as an temporary, high capacity cleansing structure in an air conditioning circuit whose refrigerant charge has been contaminated by a compressor burnout. Under this method, the contaminated refrigerant charge is appropriately removed, the burned out compressor motor is replaced with a new compressor motor, and the acid purification system is temporarily connected in the refrigerant circuit conduit between the evaporator and the compressor inlet. A new charge of clean refrigerant is then placed in the air conditioning circuit and the new compressor motor is started to cycle the new refrigerant through the circuit. All refrigerant discharged from the evaporator is flowed sequentially through the oil separator and filter portions of the acid purification system before entering the compressor inlet, thereby very rapidly cleansing the new refrigerant charge of acid and particulate contaminants left in the circuit after the original refrigerant was removed. In this manner, the new compressor motor is protected, and residual acid and particulate matter is very rapidly removed from the circuit. After refrigerant cleanup is achieved, the portable acid purification system is removed from the circuit, and the circuit is returned to normal operation.

3. The portable refrigerant flushing and transfer system may be conveniently used in place of a much larger and heavier conventional refrigerant machine to very rapidly withdraw refrigerant from an air conditioning circuit and transfer the withdrawn refrigerant into a suitable refrigerant storage container. This may be accomplished simply by connecting a first hose, having a filter connected therein, between the circuit outlet and the inlet valve of the flushing and transfer system, connecting a second hose between the flushing and transfer system outlet valve and the inlet of the storage container, and then starting the liquid refrigerant pump. Because the refrigerant is withdrawn and transferred in a liquid state, the overall transfer rate is greatly increased compared to conventional refrigerant recovery machines that withdraw the refrigerant in a gaseous state. The overall purity of the recovered refrigerant may be significantly increased by operatively connecting the portable acid purification system in the aforementioned first hose.

4. The portable refrigerant flushing and transfer system of the present invention may also be operated to utilize liquid refrigerant to very rapidly flush out and cleanse the interior of a previously evacuated air conditioning system refrigerant circuit. This may be accomplished, preferably using the aforementioned adapter kit, by simply connecting the liquid port of a refrigerant storage container (in which a supply of liquid refrigerant is disposed) to the inlet valve of the flushing and transfer system, connecting the flushing and transfer system outlet valve to the inlet fitting of the air conditioning circuit, connecting the vapor port of the storage container to the outlet fitting of the air conditioning circuit, and starting the liquid refrigerant transfer pump. Enhanced refrigerant filtration during the overall liquid flushing operation may be achieved by operatively connecting the portable acid purification system in the line between the air conditioning circuit outlet and the inlet of the refrigerant storage container.

BRIEF DESCRIPTION OF THE DRAWINGS

FIG. 3 is a perspective view of a portable refrigerant flushing and transfer system embodying principles of the present invention;

FIG. 5 is a schematic diagram that illustrates the portable flushing and transfer system being used to flush out a representative air conditioning circuit, and also illustrates a specially designed adapter kit used in conjunction with the flushing and transfer system;

FIG. 6 is a schematic diagram that illustrated the portable acid purification and flushing and transfer systems being used to flush out an air conditioning circuit and utilizing the adapter kit shown in FIG. 5;

FIG. 7 is a schematic diagram illustrating the use of the flushing and transfer system in recovering refrigerant from an air conditioning circuit;

FIG. 8 is a schematic diagram illustrating the acid purification and flushing and transfer systems being used to recover refrigerant from an air conditioning circuit;

FIG. 9 is a schematic diagram illustrating the acid purification system being used as a pre-filter unit in conjunction with a conventional refrigerant recycling and recovery machine; and FIG. 10 is a schematic diagram illustrating the manner in which the acid purification system may be utilized as a temporary cleanup filtration means in to protect a new compressor motor installed in an air conditioning circuit after a previous compressor motor burnout therein.

DETAILED DESCRIPTION

When the motor of an air conditioning circuit compressor burns out, it tends to burn the oil entrained in the refrigerant, thereby substantially increasing the acid content of the refrigerant/oil mixture within the refrigerant circuit. This increased acidity strips away copper from the circuit piping, and from the compressor motor windings, and undesirably deposits the stripped-away copper on the compressor bearings, thereby often causing subsequent damage to the compressor even after its burned out motor has been replaced.

A conventional solution to this acidity problem has been to install a small, temporary acid "clean up" filter in the air conditioning circuit line between the evaporator and the compressor inlet after the new compressor motor has been installed and the air conditioning circuit given a new charge of refrigerant. The filter must be replaced several times during the first few days that the air conditioning system is operated after compressor motor replacement. When the refrigerant is finally cleansed of residual acid remaining in the circuit after the removal of the original contaminated refrigerant, the final filter element is removed and the cut away circuit pipe section reconnected to return the circuit to its normal operation. This is a rather tedious and slow process, and during at least the initial phase of the process the new motor can still be subject to an appreciable amount of acid damage.

Figure 1:
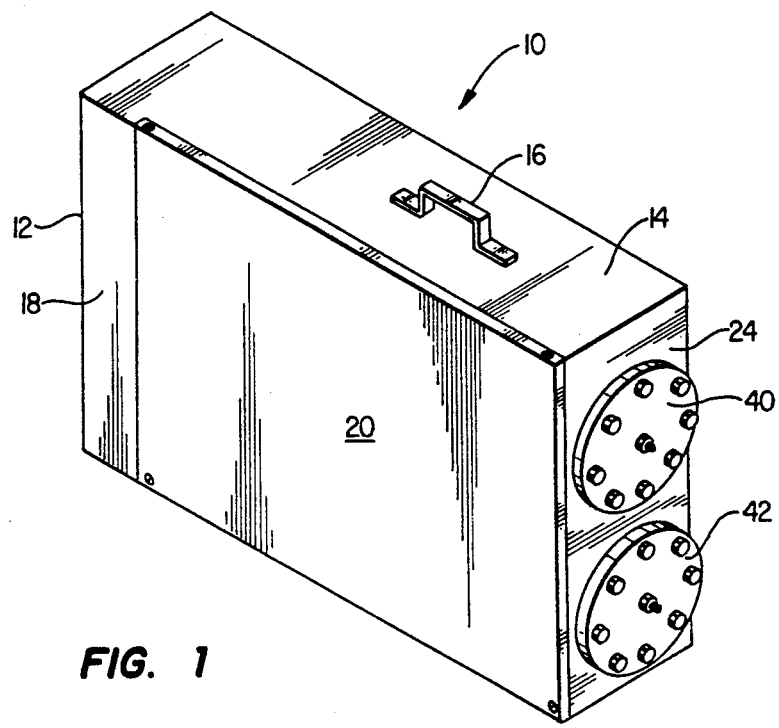
FIG. 1 is a perspective view of a portable refrigerant acid purification system embodying principles of the present invention.
Figure 2:
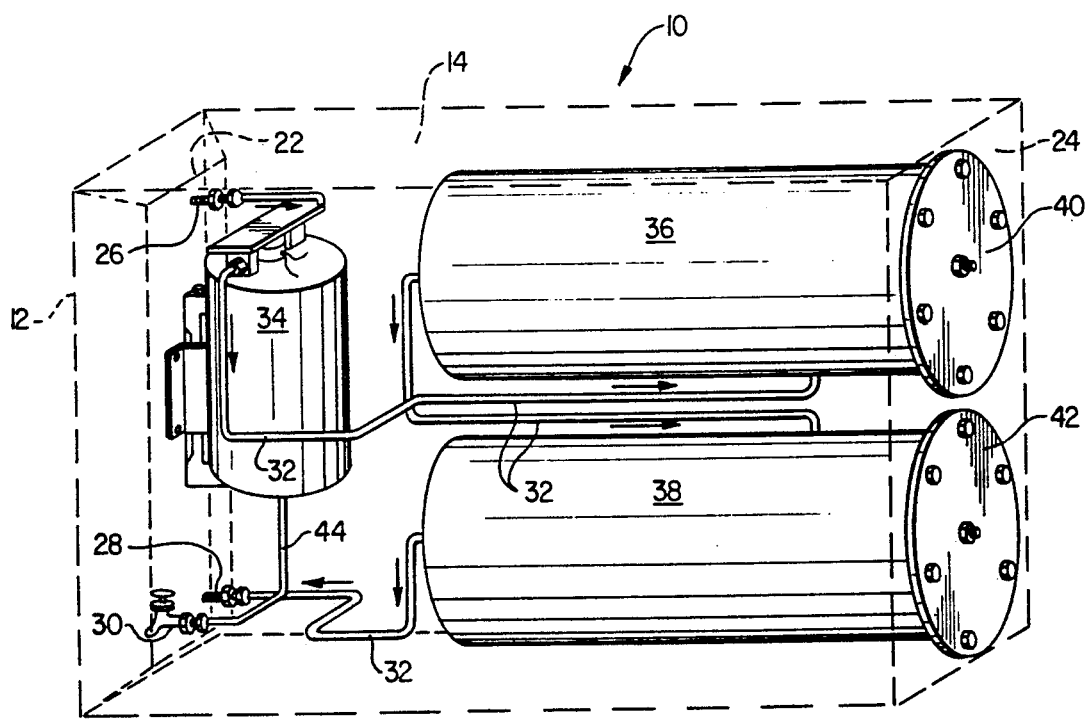
FIG. 2 is an enlarged scale perspective view of the acid purification system, with its outer housing shown in phantom, illustrating its internal operating components.

Referring now to FIGS. 1 and 2, the present invention affords an improved solution to this residual acid removal problem by providing a specially designed portable refrigerant acid purification system 10. System 10 includes a rectangular metal housing 12 having a top wall 14 to which a carrying handle 16 is secured; a front side wall having installed thereon a removable access panel 20; a recessed left end wall 22; and a right end wall 24.

As illustrated in FIG. 2, an externally projecting refrigerant inlet fitting 26 is mounted on an upper end portion of housing wall 22 above externally projecting refrigerant discharge and filter drain fittings 28 and 30 mounted on a lower end portion of the wall. Inlet and discharge fittings 26 and 28 are connected by a conduit 32 disposed within the housing 12. Also mounted in the housing 12 are a vertically oriented cylindrical oil separator of the accumulation/distillation type, and a pair of horizontally oriented upper and lower dual core filter assemblies 36 and 38.

The separator 34 is operatively connected in the conduit 32 adjacent the inlet fitting 26, and the upper and lower filter assemblies 36 and 38 are connected in series in the conduit 32 between the separator 34 and the refrigerant discharge fitting 28. Accordingly, a flow of refrigerant entering the inlet fitting 26 sequentially passes through the oil separator 34, the upper filter assembly 36 and the lower filter assembly 38 before exiting the discharge fitting 28.

As illustrated, the filter assemblies 36 and 38 have removable right end access plates 40 and 42 which are exteriorly mounted on the right housing end wall 24 and permit servicing of the filter assemblies without removing the access panel 20. The oil separator 34 may be periodically drained via a conduit 44 connected between the bottom end of the separator 34 and the external drain fitting 30. The acid purification system 10, as illustrated, weighs approximately 65 pounds and thus may be relatively easily hand carried from place to place.

Turning now to FIG. 10, a representative air conditioning circuit 46 has been schematically depicted to illustrate one manner in which the acid purification system 10 may be advantageously used. The air conditioning circuit 46 includes a compressor 48, a condenser 50, an expansion valve 52 and an evaporator 54—all connected in series as shown by a refrigerant conduit system 56.

When the compressor motor burns out, the motor is removed and replaced with a new motor 58, the now contaminated refrigerant is removed from the air conditioning circuit 46, and a small section 56a is removed from the conduit portion between the evaporator 54 and the suction side of the compressor 48 leaving open conduit ends 56b and 56c. The acid purification system 10 is then hand carried to the air conditioning circuit 46 and the system inlet and outlet fittings 26 and 28 are respectively connected to the conduit ends 56b and 56c using, for example, flexible hoses 60 and 62. The circuit 46 is then provided with a fresh charge of clean refrigerant, and the compressor 58 is started.

During compressor operation, gaseous refrigerant discharged from the evaporator 54 is operatively drawn through the acid purification system 10 before entering the suction side of the compressor 48, thereby being cleansed of acid and entrained particulate matter and other contaminants each time it interiorly traverses the portable system 10. Compared to the relatively small single filter conventionally installed in place of the removed circuit pipe section 56a, the oil separator and filter assemblies used in the portable system have considerably greater contaminant removal capabilities.

Accordingly, the residual acid and other contaminants in the new refrigerant charge are typically removed by the portable system 10 in a matter of hours instead of a period of several days, and the internal components of the system 10 normally do not have to be changed during this recycling and purification process. Additionally, due to the much more rapid acid/contaminant cleanup provided by the system 10, the new motor 58 is subjected to residual acid and contaminant exposure for a far smaller time period. After the new charge of refrigerant has been cleansed, the system 10 is removed form the circuit and the circuit pipe ends 56b,56c are appropriately rejoined to return the air conditioning circuit 46 to its normal operating flow configuration.

In addition to this recycling/purification use, the portable acid purification system 10 may also be used in conjunction with a conventional refrigerant recovery or recovery/recycle machine 64 as schematically depicted in FIG. 9. The conventional machine 64 is typically provided with an inlet 66 which is connected to a manifold gauge set 68 in turn connected to an inlet 70 and outlet 72 of an air conditioning circuit 74 form which refrigerant is to be recovered. During operation of the conventional machine 64, gaseous refrigerant is withdrawn from the circuit 74 by the machine's compressor, passed through a condenser, and then flowed in liquid form into a suitable receiving/storage vessel.

Particularly where the machine 64 has refrigerant recycling capabilities, its filtration system is not especially large since it is designed to purify the refrigerant withdrawn from the circuit 74 by repeatedly passing the refrigerant through the filtration system. Accordingly, when the refrigerant being withdrawn in a pure recovery mode has a high acid content it travels in a single "pass" through this relatively small machine filtration system, and only a relatively small portion of the acid is removed from the refrigerant before it comes into contact with the machine's compressor. Because of this, the machine's compressor may be subjected to premature corrosion failure.

To solve this problem, and advantageously prolong the machine compressor life, the portable acid purification system 10 of the present invention may be used as a protective pre-filter unit by operatively interposing it between the manifold gauge set 68 and the inlet 66 of the machine 64 using, for example, a flexible hose 76 interconnected between the inlet 26 of system 10 and the manifold gauge set 68, and a flexible hose 78 interconnected between the machine inlet 66 and the system outlet 28.

In this manner, all of the gaseous refrigerant withdrawn from the circuit 74 sequentially passes through the large capacity oil separator and filter assembly portions of the system 10 before entering the machine inlet 66. Thus, even though the withdrawn refrigerant still makes only a single pass through the machine 64 before entering the machine's liquid storage vessel, the stored liquid is considerably purer, and the machine's compressor is subjected to considerably less acid contact.

Figure 4:
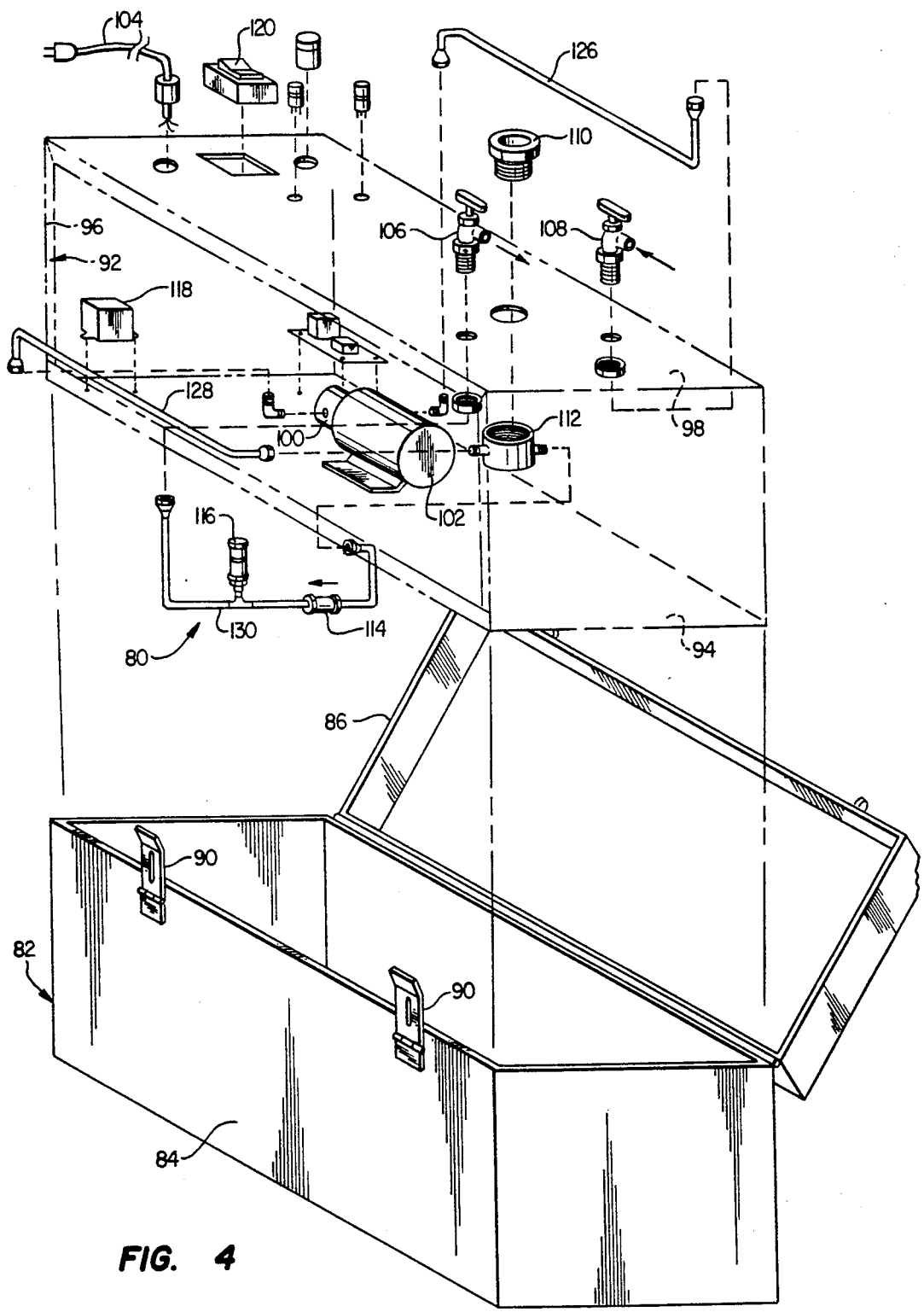
FIG. 4 is an enlarged scale exploded perspective view of the flushing and transfer system, with a drop-in insert structure portion thereof being shown in phantom for illustrative clarity.

Referring now to FIGS. 3 and 4, the present invention also uniquely provides a portable refrigerant flushing and transfer system 80 that includes a rectangular housing 82 having an open-topped base portion 84, a hinged lid portion 86 provided with a top carrying handle 88, and a pair of lid latches 90 mounted on the front side of the housing base portion. Nested within the housing base portion 84, and upwardly removable therefrom as shown in FIG. 4, is a drop-in tray structure 92 illustrated in phantom for illustrative clarity. Tray structure 92 has a rectangular, shallow pan-shaped base 94 to which an inverted U-shaped top portion 96 is secured as shown, top portion 96 having an upper rectangular wall 98.

The operating components of the flushing and transfer system 80 are secured to the tray structure 92 and include a high flow rate (approximately 25 lb./min.) liquid refrigerant transfer pump 100 having an electric drive motor 102 mounted on the tray base 94 and provided with a suitable power cord 104 extending outwardly through the top tray wall 98; refrigerant outlet and inlet valves 106,108 mounted on and projecting upwardly for the top tray wall 98; a sight glass 110 having a threaded base portion 112 carried on the underside of the top tray wall 98; a check valve 114; and a relief valve 116. Also connected to the tray structure 92 as shown are the various electrical components of the system 80 such as a relay 118, an on-off switch 120, and a pair of pilot lights 122 and 124.

The refrigerant inlet valve 108 is connected to the inlet of pump 100 by a conduit. The outlet of the pump 100 is connected to one side of the sight glass base 112 by a conduit 128, with the other side of the sight glass base 112 being connected to the refrigerant outlet valve 106 by a conduit 130 in which the check valve 114 and the relief valve 116 are connected in series. During operation of the pump 100, liquid refrigerant drawn into the inlet valve 108 is sequentially flowed through the conduit 126, the pump 100, the conduit 128, the sight glass base 112, the conduit 130, and outwardly through the refrigerant outlet valve 106. The entire refrigerant flushing and transfer system 80 representatively weighs only approximately twenty five pounds, thus making it easily hand carryable from place to place.

Referring now to FIG. 5, the portable system 80 may be used, by itself, to flush out a previously evacuated air conditioning circuit 132, having an inlet 134 and an outlet 136, using clean liquid refrigerant disposed in a storage tank 138 having a liquid port 140 and a vapor port 142. To facilitate the operative connection of the portable refrigerant flushing and transfer system 80 to a variety of air conditioning circuits, a specially designed adapter kit 144 is provided.

Kit 144 is similar to the adapter kit illustrated and describe din the aforementioned copending U.S. patent application Ser. No. 715,429 and includes a flexible hose 146 having threaded couplers 148,150 at its opposite ends; a flexible hose 152 having threaded couplers 154,156 at its opposite ends; a flexible hose 158 having threaded couplers 160,162 at its opposite ends; a strainer 164; a Schrader tee 166; a sight glass 168; and a filter 170. Strainer 164 is interconnected between the threaded coupler 160 and one end of the Schrader tee 166, the opposite end of which is connected to the threaded coupler 154. The sight glass 168 is interconnected between the threaded coupler 156 and one end of the filter 170, the opposite end of the filter 170 being provided with a threaded connection 172.

The adapter kit 144 also includes a pair of adapter fittings 174,176 respectively connected at inner ends thereof to the threaded hose couplers 148,160. As illustrated and described in copending U.S. patent application Ser. No. 715,429, these adapter fittings are configured to precisely mate with the condenser inlet and outlet fittings on, for example, a particular brand of automotive vehicle air conditioning system, or other type of air conditioning system. The adapter fittings may be configured as flare fittings, O-ring pressure fittings, barb fittings, or the "universally" configured adapter fittings shown in copending U.S. patent application Ser. No. 715,429.

A variety of removable adapter fittings may be furnished as a portion of the flushing adapter kit 144. For example, a "specific" adapter fitting set may be provided to permit the kit to be used in conjunction with the automotive air conditioning systems of a particular car or truck manufacturer, the specific adapter fitting set including a variety of adapter fittings connectable to the compressor, evaporator or condenser portion of the selected type of air conditioning system line.

Alternatively, a "master" set of adapter fittings may be provided to permit flushing connection to the compressor, evaporator or condenser portions of air conditioning systems produced by a selected variety of different manufacturers.

The portable refrigerant flushing and transfer system 80 may be operatively connected to the air conditioning circuit 132 by connecting the threaded coupler 150 to the outlet valve 106 and connecting the adapter 174 to the air conditioning circuit inlet 134; connecting the filter end 172 to the vapor port 142 of the storage tank 138; and interconnecting the inlet valve 108 and the liquid port 140 of the tank 138 using an appropriate hose 178. Upon startup of the pump 100, liquid flushing refrigerant initially stored int eh tank 138 is withdrawn for the tank, forced through the hose 146 and into and through the interior of the air conditioning circuit 132 to entrain contaminants remaining therein.

The contaminant bearing refrigerant is then forced back into the tank 138 through the strainer 164 and filter 170, thereby cleansing the refrigerant before it re-enters the tank. This closed loop refrigerant flushing flow is maintained for a period sufficient to thoroughly clean the interior of the air conditioning circuit 132. The total flushing time period associated with the portable system 80 is considerably shorter than that typically required when a conventional recycling machine is used. This greatly shortened time period is due to the fact that conventional machines perform their flushing operation using gaseous refrigerant and have a flushing capacity in the range of approximately 2-3 pounds per minute. In contrast, the system 80 uses liquid refrigerant to flush the air conditioning circuit 132 and has an operating capacity of approximately 25 pounds per minute of liquid flushing refrigerant.

After the flushing operation is completed, the refrigerant in the overall flushing circuit may be easily removed therefrom by simply connecting an evacuation line between the side fitting 182 of the Schrader tee 166 and the inlet of a conventional refrigerant recovery machine (not shown in FIG. 5). If desired, a conventional in-line gauge/manifold system 184 may be installed in the evacuation line 180.

As schematically depicted in FIG. 6, the overall refrigerant filtration efficiency of the portable flushing and transfer system 80 may be substantially improved simply by connecting the portable acid purification system 10 in series therewith so that the flushing refrigerant recirculated by liquid pump 100 is drawn from the refrigerant tank 138 and then sequentially flowed through the flushing and transfer system 80, the air conditioning circuit 132, the acid purification system 10 and back into the tank 138. When the flushing cycle is completed, the refrigerant in the overall flushing circuit may be evacuated as described above using the evacuation line 180 connected to the Schrader tee 166.

Referring now to FIG. 7, the portable refrigerant flushing and transfer system 80 may also be used in a recovery mode, to transfer refrigerant from the representative air conditioning circuit 132 into the storage tank 138 simply by operatively interconnecting the system 80 between the circuit 132 and the tank 138 and starting the system's pump 100. To make this connection, a suitable conduit 186, having a filter/drier unit 188 and a manifold 190 connected as shown therein, is interconnected between the circuit outlet 136 and the system inlet valve 106, and a conduit 192 is interconnected between the system outlet valve 108 and the storage tank vapor port 142.

This use of the system 80 permits a very rapid transfer of the circuit refrigerant into the tank 138, and conveniently permits such transfer in equipment locations in which it would be difficult if not impossible to use much larger conventional refrigerant recovery/recycling machinery. As schematically shown in FIG. 8, the purity of the circuit refrigerant rapidly transferred into the tank 138 using the portable system 80 may be substantially increased by connecting the portable acid purification system 10 between the system 80 and the tank 138.

It can be readily seen from the foregoing that the present invention's provision of the portable refrigerant handling systems 10 and 80, together with the specially designed adapter kit 144, enables the various described refrigerant handling tasks to be accomplished more quickly and easily using the systems 10 and 80 by themselves, in combination with one another, and in conjunction with conventional refrigerant recovery/recycling apparatus. The portable systems 10 and 80 are smaller, lighter, simpler to use and less expensive to fabricate than conventional refrigerant handling apparatus. Despite their simplicity, however, the systems 10 and 80, as illustrated and described above, provide a desirably enhanced degree of operational versatility.

The foregoing detailed description is to be clearly understood as being given by way of illustration and example only, the spirit and scope of the present invention being limited solely by the appended claims.

What is claimed is:

1. A method of repairing an air conditioning system having a refrigerant circuit including a compressor with a burned out motor, an evaporator, and a refrigerant conduit portion interconnected between the evaporator refrigerant outlet and the compressor refrigerant inlet, said method comprising the steps of:

removing the burned out compressor motor;

removing the refrigerant from said refrigerant circuit;

removing a section from said refrigerant conduit portion in a manner leaving a first open conduit end associated with said evaporator, and a second open conduit end associated with said compressor;

providing a portable, hand carryable system for receiving a throughflow of air conditioning refrigerant and removing acid and particulate contaminants therefrom, said system comprising a housing having a carrying handle operatively secured thereto; an external inlet valve mounted on said housing for receiving said refrigerant throughflow; an external outlet valve mounted on said housing for discharging said refrigerant throughflow; an accumulation/distillation type oil separator disposed within said housing; at least one filter assembly disposed in said housing; and a refrigerant conduit disposed in said housing and connected at its opposite ends to said inlet and outlet valves, said oil separator and said at least one filter assembly being operatively connected in series in said refrigerant conduit with said oil separator being upstream of said at least one filter assembly;

respectively connecting said external inlet and outlet valves to said first and second open conduit ends to thereby operatively connect said portable, hand carryable system between and in series with said evaporator and said compressor;

installing a new compressor motor in place of the removed compressor motor;

placing a new charge of clean refrigerant in said refrigerant circuit;

starting the new compressor motor to continuously cycle the new refrigerant charge through said refrigerant circuit and said portable, hand carryable system to cleanse the new refrigerant charge of acid and particulate impurities therein resulting from the previous compressor motor burnout;

stopping the new compressor motor; and disconnecting said portable, hand carryable system and operatively reconnecting said first and second open conduit ends.

* * * * *